Feb. 27, 1951 W. E. HAINLINE 2,543,018
ADJUSTABLE RIVET CUTTER
Filed Aug. 11, 1945 2 Sheets-Sheet 2
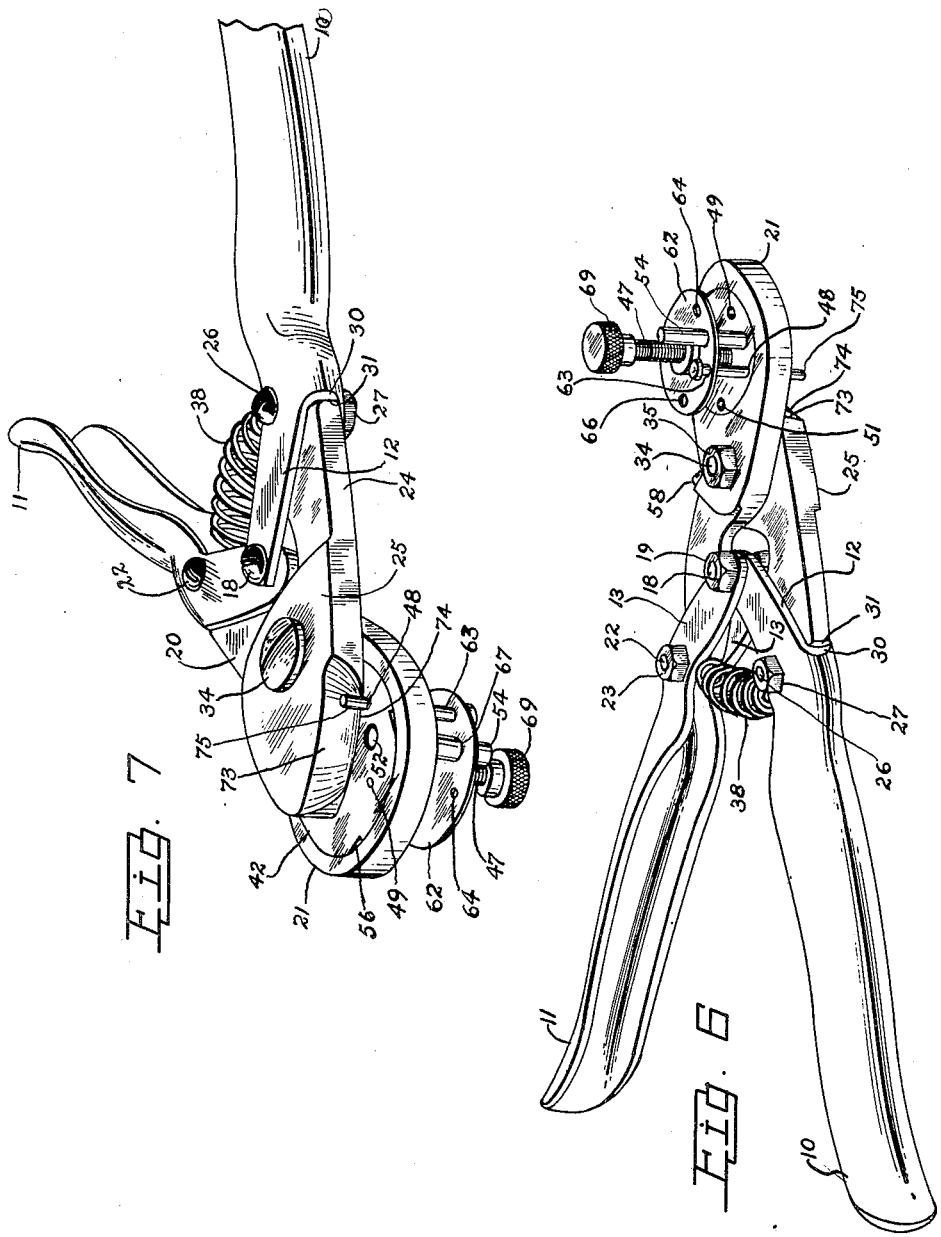
INVENTOR
WALLACE E. HAINLINE
BY Ralph L. Chappell
ATTORNEY Patented Feb. 27, 1951

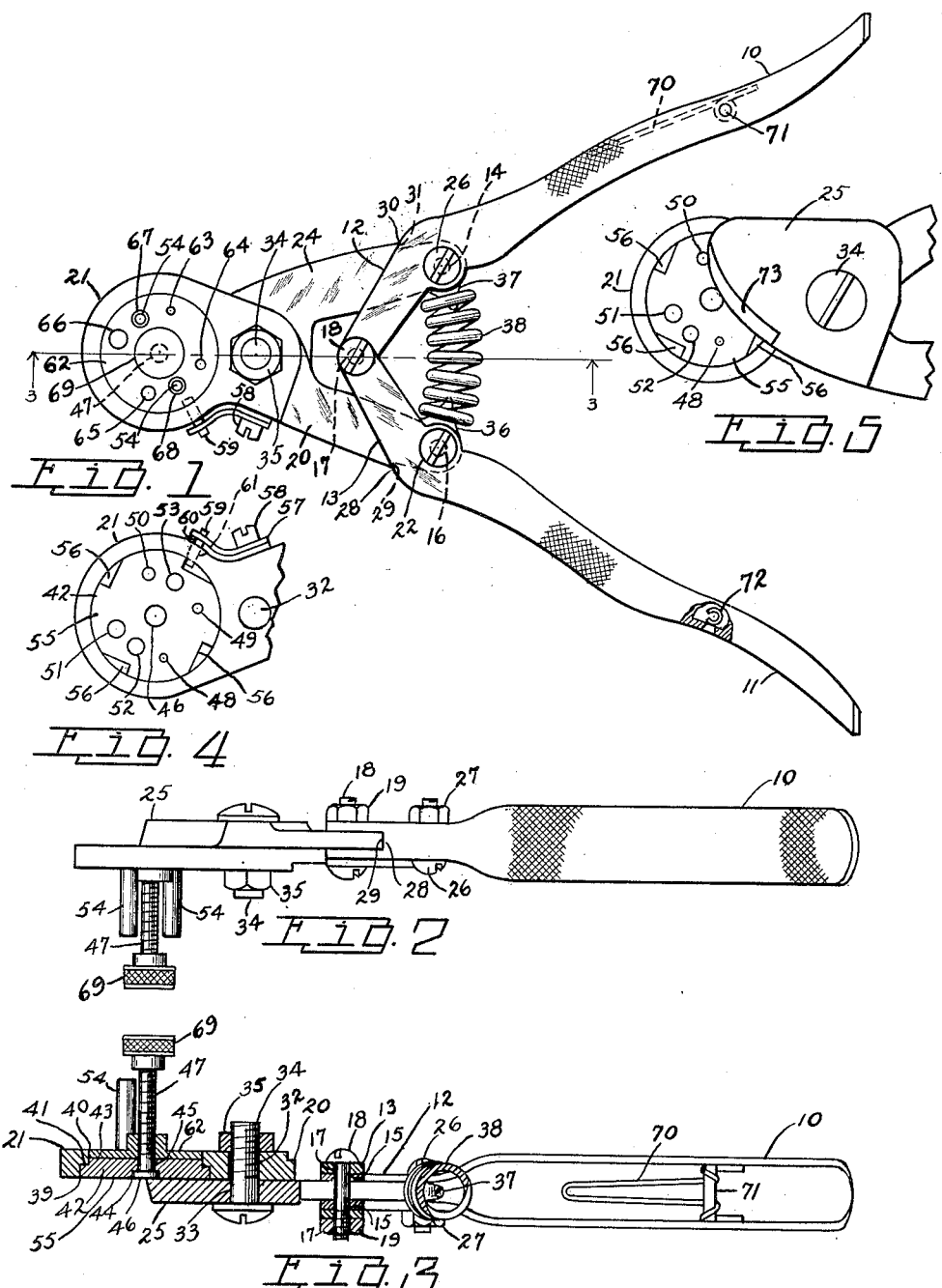

2,543,018

UNITED STATES PATENT OFFICE 2,543,018

ADJUSTABLE RIVET CUTTER

Wallace Eugene Hainline, United States Navy

Application August 11, 1945, Serial No. 610,384

3 Claims. (Cl. 30—131)

(Granted under the act of March 3, 1883, as amended April 30, 1928; 370 O. G. 757)

The present invention relates to an adjustable rivet cutter.

One of the objects of the present invention is the provision of a device which is simple and economical in construction, easily manipulated, effective and certain in its operation.

Another object of the present invention is the provision of a device that will eliminate the necessity of carrying in stock a large number of rivets of varying length.

A still further object of the present invention is the provision of a device adapted to cut rivets to any desired length.

A still further object of the present invention is the provision of a device that will cut or shear rivets perpendicular to the axis, without leaving burrs on the sheared edge.

A still further object of the present invention is the provision of a device that is portable and may be carried in the average mechanic's tool box.

Other objects and advantages of the invention will become apparent during the course of the following detailed description when taken in connection with the accompanying drawings, forming a part of this specification, and in which drawings:

Figure 1 is a top plan view of the device.

Figure 2 is a side elevational view of same.

Figure 3 is a sectional view taken on line 3—3 of Figure 1 looking in the direction of the arrows.

Figure 4 is a fragmentary bottom view of the die plate holder and die plate per se.

Figure 5 is a bottom view of the die plate, the cutter jaw being shown enlarged.

Figure 6 is a perspective view of the top of the device and illustrating the rivet guide plate.

Figure 7 is a perspective view of the bottom of the device and illustrating the cutting jaw in position to cut a rivet.

Referring to the drawings the numerals 10 and 11 represent handles of substantially U-shaped configuration, the end portions 12 and 13 being in the form of a clevis and being disposed inwardly toward each other. The end portion 12 is provided with apertures 14 and 15, and the end portion 13 with apertures 16 and 17. The portions 12 and 13 are pivotally connected by a clevis bolt 18 that passes through the apertures 15 and 17, the bolt being secured by a nut 19. It is to be noted that the end 12 fits into the end 13. The arm 20 of a die holder 21 is pivotally connected to the handle 11 by a clevis bolt 22 and it is secured by a nut 23. The arm 24 of a cutter jaw 25 is pivotally connected to the handle 10 by a clevis bolt 26 and it is secured by a nut 27. It is to be noted that the arm 20 is of greater width at the crown 28 of the clevis 13 forming an abutment 29. Similarly the arm 24 is of a greater width at the crown 30 of the clevis 12 forming an abutment 31. The die holder 21 is provided with an aperture 32 that is in alignment with an aperture 33 in the cutter jaw 25. The apertures 32 and 33 receive a bolt 34 that is engaged by a nut 35 that secures the die holder and cutter jaw together. The nut 35 may be adjusted for pivotal movement of the die holder 21 and the cutter jaw 25. The arm 20 is provided with a lug 36, and arm 24 with a similar lug 37, the lugs serving as a means for holding a spring 38 that is interposed between the handles.

The die holder 21 is provided with a bore 39 and a smaller bore 40 that is in communication with the bore 39, the smaller bore providing an abutment 41. Within the bore 39 there is mounted a die 42 adapted for rotative movement therein, and having a portion 43 of smaller diameter that provides a seat that engages the abutment 41. It is to be noted that the portion 43 is approximately one-half the vertical height of the bore 40 for a purpose to be later described. The die 42 is provided with a counterbore 44 having smaller bore 45 in which is journaled the head 46 and shank of a threaded screw 47. The die 42 is provided with rivet receiving apertures 48, 49, 50 and 51, each being of a different diameter. The die 42 is further provided with bores 52 and 53 that receive guide pins 54. The bottom face 55 of the die 42 as shown in Figure 4 is provided with a plurality of recessed notches 56. To one edge of the die holder is an L-shaped spring 57 that is secured by a retaining screw 58, one end of the spring being engaged by the head 59 of a pawl 60 that is seated in a bore 61 in the die holder 21. Mounted on the screw 47 is an adjustable stop plate 62 that is provided with apertures 63, 64, 65 and 66, each being equal to the diameter respectively of apertures 48, 49, 50 and 51. The stop plate 62 is further provided with apertures 67 and 68 that are adapted to be engaged by guide pins 54. The screw 47 is provided with a knurled head 69 fixedly secured thereon for adjusting the stop plate 62 to the desired length of a rivet to be cut. In the handle 10 there is mounted a spring 70 that is retained in the handle by a pin 71, and in the handle 11 there is mounted a retaining hook 72 for receiving the spring 70 and for holding the handles in locked position.

The cutter jaw 25 on one side edge is provided with a beveled portion 73 that forms the cutting edge 74 for the cutter jaw.

In the operation of the rivet cutter, the screw 47 is rotated in clockwise direction until the stop plate 62 is raised to the desired length of the rivet to be cut. The die 42 is rotated in the die holder 21 by using the extending guide pins 54 as a handle, the pawl 60 permitting rotation in one direction and acting as a stop to prevent reverse rotation by pressure of the cutting edge 74 on a rivet placed in one of the apertures 48 to 51 when adjacent the cutting edge.

As is readily seen, shearing power or increased leverage is gained by the use of handles 10 and 11 fulcrumed near their ends to the die holder 21 and cutter jaw 25.

Due to the adjustment rivets may be cut to the desired length. It can be seen from the above, rivets may be of a uniform length and cut to a desired length. By providing the present rivet cutter the necessity of carrying a large stock of various sized rivets is eliminated.

The invention described herein may be manufactured and used by or for the Government of the United States of America for governmental purposes without the payment of any royalties thereon or therefor.

What I claim is:

1. In a rivet cutter the combination of a pair of handles fulcrumed together at one of their ends, a die holder and a cutter bar pivotally secured together and operably pinioned one each to each handle near the fulcrum point, a die having a plurality of various sized holes rotatably secured in said die holder, a beveled cutting edge on said cutter bar, recessed notches provided in the periphery of the die, a pawl mounted on the die holder and cooperative with said notches for selectively positioning said die to have one of said holes adjacent said cutting edge, a rivet spacer plate having a like number of identically sized holes for engagement with the shank of a rivet to be cut, a threaded screw journaled at one end in said die and movably securing said spacer plate parallel to said die, and a pair of guide pins diametrically mounted in said die and extending through said spacer stop plate.

2. In a rivet cutter the combination of a pair of handles fulcrumed together at one of their ends, a die holder and a cutter bar pivotally secured together and operably pinioned one each to each handle near the fulcrum point, a die having a plurality of various sized holes rotatably secured in said die holder, a beveled cutting edge in said cutter bar, recessed notches provided in the periphery of the die, a pawl mounted in the die holder and cooperating with said notches for selectively positioning said die to have one of said holes adjacent said cutting edge, a rivet spacer plate having a like number of identically sized holes for engagement with the shank of a rivet to be cut, a threaded screw journaled at one end in said die and movably securing said spacer plate parallel to said die, and a pair of guide pins diametrically mounted in said die and extending through said spacer stop plate.

3. In a rivet cutter the combination of a pair of handles fulcrumed together at one of their ends, a die holder and a cutter bar pivotally secured together and operably pinioned one each to each handle near the fulcrum point, a die having a plurality of various sized holes rotatably secured in said die holder, a beveled cutting edge on said cutter bar, means for selectively positioning said die to have one of said holes adjacent said cutting edge, rivet holding means engageable with the head of a rivet for holding the shank in the hole adjacent the cutting edge, said rivet holding means including a spacer plate having similar sized holes as said die, a pair of guide pins in said die and in said spacer plate for alignment therewith, and a knurl-ended screw threadably engaging said spacer plate and journaled in said die for adjustable movement therebetween.

WALLACE EUGENE HAINLINE.

REFERENCES CITED

The following references are of record in the file of this patent:

UNITED STATES PATENTS

| Number | Name | Date |
|---|---|---|
| 13,570 | Grover | Sept. 18, 1855 |
| 54,520 | Flinn | May 8, 1866 |
| 456,966 | Schweeters | Aug. 4, 1891 |
| 1,446,540 | Bernard | Feb. 27, 1923 |
| 1,741,109 | Heimerdinger | Dec. 24, 1929 |
| 1,831,477 | Heinrich | Nov. 10, 1931 |